Sept. 23, 1952  R. R. LOBOSCO  2,611,887
LINE TRACKER CONTROL ELECTRONIC DRIVE
Filed Nov. 25, 1949
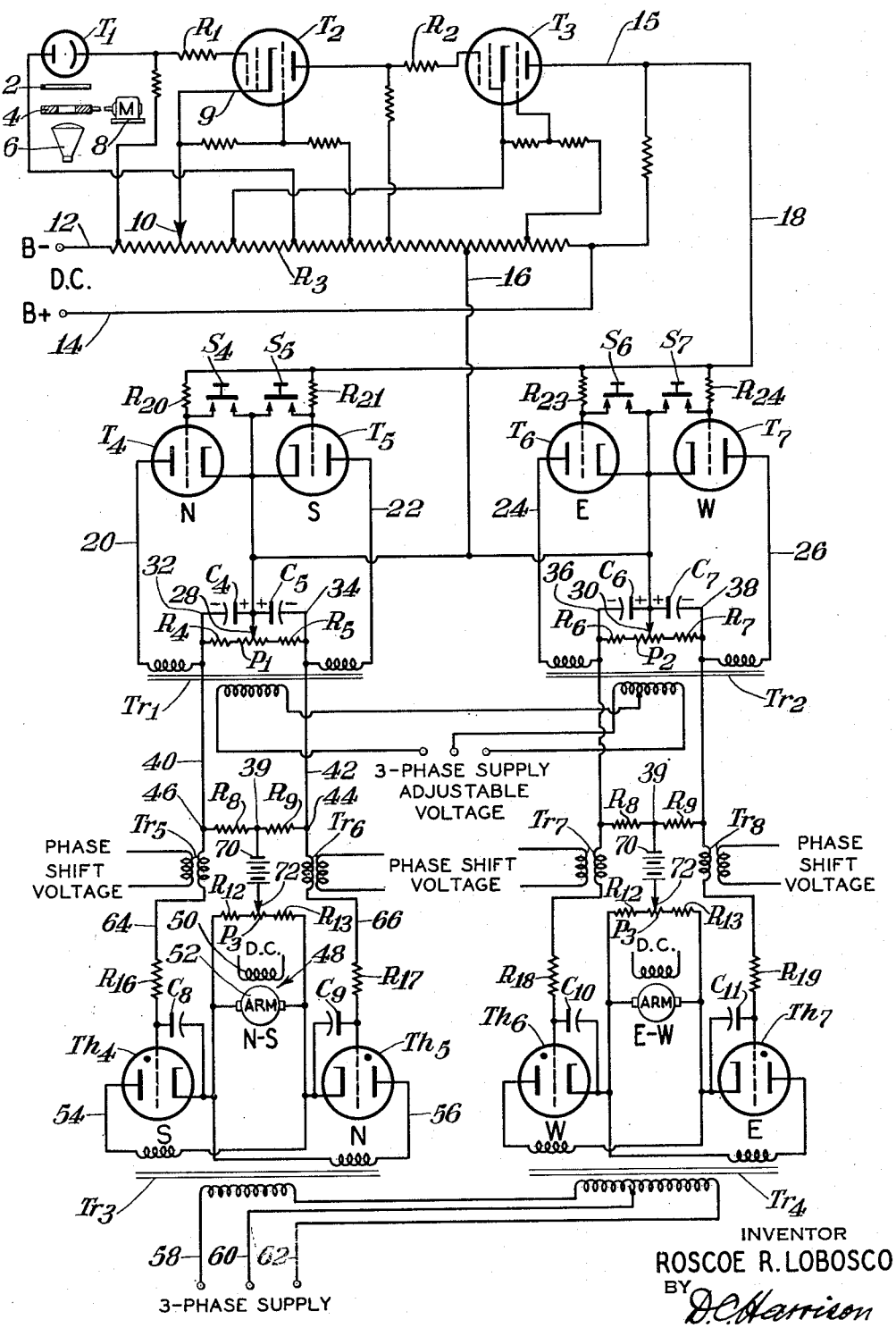
INVENTOR
ROSCOE R. LOBOSCO
BY
D.C. Harrison
ATTORNEY Patented Sept. 23, 1952

2,611,887

UNITED STATES PATENT OFFICE 2,611,887

LINE TRACKER CONTROL ELECTRONIC DRIVE

Roscoe R. Lobosco, Elizabeth, N. J., assignor, by mesne assignments, to Union Carbide and Carbon Corporation, a corporation of New York Application November 25, 1949, Serial No. 129,481

9 Claims. (Cl. 318—19)

This invention relates to automatic tracers, and more particularly to photocell tracers of the type disclosed by the Fowle and Kennedy Patents 2,397,933 and 2,430,924.

In this type of line tracker control a stream of radiant energy is subjected to alternately overlapping and clearing relation with successive small edge zones along a contour, whereby part of the stream is affected by said contour and the remainder of said stream passes or escapes interception by said contour, thereby causing an impulse for each alternation; and the contour and stream are relatively propelled along the contour in response to a part of each impulse; and the alignment of the direction of relative propulsion to the direction of the contour is corrected in response to another part of each impulse. The alternations are cycles of rapidly recurring frequency in substantially regular succession.

Such patents disclose automatic tracers comprising a photocell, the output of which is fed into an amplifier tube, the output of the amplifier tube being, in turn, fed into an electrically rotating timing circuit or discriminator which determines the relative value of the north, east, south and west directional components of the line or templet being traced by the photocell. Signals corresponding to N and S components are fed into a N-S dynamo-electric generator which feeds the N-S drive motor of the machine. Similarly, signals corresponding to the E-W components are fed into an E-W drive motor. Operational details of the tracer are well known to those skilled in the art and are fully revealed in such patents, particularly in connection with Fig. 9 of Patent 2,397,933. While workable tracers can be made according to the disclosure of such patents, the resulting machine has certain inherent limitations including the following:

The speed of response is limited because the output of the dynamo-electric generators cannot change fast enough in response to a change in control voltage. The maximum rate of acceleration and deceleration of the drive motors is limited because the maximum power which the dynamo-electric generators of reasonable size and fast response can deliver to the drive motors is limited. Such factors limit the maximum tracing speed and the degree of intricacy of the line or templet to be followed.

The speed-load characteristic of the dynamo-electric generator-motor combination is such that the transverse speed varies with the load. The maximum to minimum operating speed ratio is limited to approximately 4 to 1. Gear changes or similar means must be provided in cases where it is necessary to increase the operating range.

The drive motors do not rotate smoothly at low speeds but tend to move in a series of jerks.

The response of the dynamo-electric generators is not always the same for a given field current because of residual magnetism in the generator field structure. The strength of the residual magnetism is dependent on both the polarity and the strength of the last signal applied to the generator fields, and such factors are constantly changing as the traced contour changes. The speed of operation is proportional to the signal over only a relatively narrow range because the magnetization curve of the dynamo-electric generators is linear over only a part of the total operating range. It is difficult to get uniform operation in all directions because it is difficult to exactly balance the output of the dynamo-electric generator in both directions, and even more difficult to match two generators in performance.

With ordinary generators and motors, such limitations are very serious, but even with specially designed and costly dynamo-electric generators and motors such limitations are serious.

The main object of this invention is to provide an automatic tracer which successfully overcomes such limitations in the Fowle and Kennedy machine. Other objects are to provide simple and convenient means for adjusting the machine in a suitable tracing position; means for adjusting the traverse-speed of the machine; and an electronic-drive which avoids entirely the use of dynamo-electric generators. Additional objects will be clear to those skilled in the art from the following description.

According to the invention there is provided a photocell tracer having a novel discriminator-electronic drive circuit which greatly advances the art. Briefly, such circuit includes north, south, east and west discriminator tubes having the input circuits thereof coupled to the output circuit of a trigger tube which is responsive to amplified signals corresponding to impulses from a tracer photocell. Such photocell is mounted on a suitable carriage to view a line to be followed in the light of a beam which is interrupted periodically by a shutter which rotates at a constant speed in synchronism with suitably phased alternating potentials applied to the plate circuits of said tubes. Thyratrons are coupled to such discriminator tubes in pairs, so that north-south thyratrons and east-west thyratrons are responsive to signals from the corresponding pairs of discriminator tubes in such a way that only one thyratron of each pair will respond to a signal from the corresponding discriminator tube. East-west and north-south carriage driving motors are each connected to a common output circuit of the corresponding pair of thyratrons, so that the photocell is automatically driven along such line at a uniform speed by the firing of such thyratrons.

More intricate templets can be traced because of greater speed of response which is more uniform over a wider range and in all directions and because of greater acceleration and deceleration. Tracing errors are smaller because automatic breaking action in the discriminator-thyratron circuit neutralizes any tendency of the motors to over-speed or to overtravel. More uniform speed under load is obtained. The ratio of maximum to minimum operating speed also is several times greater than the prior art. Furthermore, cuts can be made much closer to square corners with the invention.

In the drawing the single figure is a circuit diagram of an automatic tracer illustrating the invention.

As shown in the drawing the invention comprises a tracer photocell $T_1$ which is responsive to light from an optical system including a templet 2, a rotating shutter 4, and a light source 6. The shutter is driven at a constant speed by a synchronous motor 8. The signal output of the photocell is amplified by an amplifier tube $T_2$ which is coupled to a trigger tube $T_3$. The trigger tube $T_3$ is operated, in turn, by the signal output of the amplifier tube $T_2$. Such trigger tube $T_3$ always is in either one of the following two operating conditions: (1) When there is no light on the photocell $T_1$ its grid is at substantially zero potential and its output current is at maximum value; (2) when there is light on the photocell its grid is at cutoff potential and its output current is substantially zero.

The photocell $T_1$, the amplifier tube $T_2$ and the trigger tube $T_3$ are connected together by the illustrated resistance or direct-coupled amplifier circuit comprising a common voltage divider $R_3$. The cathode circuit 9 of tube $T_2$ is connected to the voltage divider $R_3$ by an adjustable tap 10 so that the operating point of the amplifier and trigger circuit can be adjusted. The voltage divider $R_3$ is connected by leads 12 and 14 to a direct current source D. C. having a negative terminal B— and a positive terminal B+. Tubes $T_2$ and $T_3$ are equipped with series resistors $R_1$ and $R_2$ to limit the grid current of these tubes in the positive bias region, both to protect the tubes and to prevent possible grid currents from upsetting the operation of the circuit.

The output circuit 15 of the trigger tube $T_3$ is connected by conductors 16 and 18 to the input circuit of an electronic discriminator circuit comprising four discriminator tubes $T_4$, $T_5$, $T_6$ and $T_7$. Tubes $T_4$ and $T_5$ are the N and S tubes, respectively; and tubes $T_6$ and $T_7$ are the E and W tubes, respectively. Such tubes $T_4$—$T_7$ obtain their plate voltages from a two-phase alternating current supply system, so that the tubes can pass plate current for not more than 180° of each cycle. The plate voltages of the N and S tubes are 180° out of phase with each other, as are the plate voltages of the E and W tubes. Since convenient sources of power are three-phase, Scott connected transformer $Tr_1$ and $Tr_2$ are connected to supply two-phase current to plate circuits 20, 22, 24 and 26 of the tubes from a three-phase current supply, the voltage of which is adjustable. The grid circuits of such discriminator tubes are all tied together by conductor 18, and are always in either one of the following two operating conditions: (1) All of the discriminator tubes are at cutoff-grid voltage when the trigger tube $T_3$ is conducting; and (2) all tubes are at substantially zero grid voltage when tube $T_3$ is at "cutoff." Any one of the discriminator tubes will pass plate current if its grid voltage is at zero at any time during the 180° in which its plate voltage from the two-phase supply is positive.

Tubes $T_4$, $T_5$, $T_6$ and $T_7$ have in their cathode circuits correspondingly numbered substantially equal-valued resistors $R_4$, $R_5$, $R_6$ and $R_7$, and across each of these resistors correspondingly numbered substantially equal-valued condensers $C_4$, $C_5$, $C_6$ and $C_7$. Thus, when one of the discriminator tubes passes plate current it develops a voltage across the resistance-condenser or R-C combination in its cathode circuit. The magnitude of such voltage is dependent on several factors: (1) The length of the conduction period, i. e. on the number of degrees during which the discriminator tube is conductive, (2) the part of the plate voltage cycle in which it is conductive, and (3) the magnitude of the root mean square value of the alternating voltage on the plate of the tube.

A potentiometer $P_1$, $P_2$ is connected between the R-C combination of each pair of tubes. The potentiometers $P_1$ and $P_2$ have adjustable taps 28 and 30. Adjustment of tap 28, balances the output of tubes $T_4$ and $T_5$; and of tap 30 the output of tubes $T_6$ and $T_7$. These adjustments take care of small differences in tube characteristics, plate or grid voltages and values of resistance (R) and capacity (C) of the R-C circuits 32, 34, 36 and 38.

Since the N-S and E-W circuits are alike and operate similarly, the following description is mainly confined to one, i. e. the N-S circuit. The polarity of the voltages developed in the R-C circuits 32 and 34 is indicated on the drawing. Note that such voltages buck each other. Each R-C circuit stores voltage for a period of time depending on the time constant of the R-C combination.

Resistors $R_8$ and $R_9$ are connected in series at 39 and by leads 40 and 42 across resistors $R_4$ and $R_5$. The difference between the voltages developed across resistors $R_4$ and $R_5$ appears across $R_8$ and $R_9$ as a unidirectional control voltage, and the polarity of such voltage depends on whether the voltage across resistor $R_4$ or $R_5$ is the greater. When the voltage across resistor $R_4$ is greater than that across resistor $R_5$, point 44 will be positive and point 46 will be negative. Similarly, when the voltage across resistor $R_5$ is greater than the voltage across resistor $R_4$, then point 46 will be positive and point 44 will be negative. When the voltage across resistor $R_4$ equals the voltage across resistor $R_5$, then no unidirection control voltage will appear across resistors $R_8$ and $R_9$.

Since resistors $R_8$ and $R_9$ are equal, any voltage appearing across the combination, that is from point 44 to point 46, will be equally divided; that is, the voltage between points 44 and 39=the voltage between points 39 and 46.

Thyratron tubes $Th_4$, $Th_5$, $Th_6$ and $Th_7$ are coupled to the discriminator tubes in pairs. Thyratrons $Th_4$ and $Th_5$ are coupled between discriminator tubes $T_4$ and $T_5$, and a N-S motor 48 having a D. C. field winding 50 and an armature 52. The armature 52 of the N-S motor is energized by the current output of the tubes $Th_4$ and $Th_5$. The field winding 50 of the N-S motor is connected to a constant direct current source of supply. The thyratron plate circuits 54 and 56 are connected to transformers $Tr_3$ and $Tr_4$. The transformers $Tr_3$ and $Tr_4$ are Scott connected to a three-phase supply by conductors 58, 60 and 62.

Thyratron $Th_5$ drives the motor 48 and the photocell $T_1$ in a north-direction and thyratron $Th_4$ drives the machine in a south-direction. Substantially equal-valued resistors $R_{12}$ and $R_{13}$ are connected in series with a potentiometer $P_3$ and across the armature 52 of the N-S motor 48 so that half of the counter-electromotive force of the N-S motor appears across each of such resistors. Each of the thyratrons has in its grid circuit 64, 66 the secondary of a transformer which applies to the grid an A. C. phase-shift voltage lagging the plate voltage by approximately 90°. The primaries of such transformers $Tr_5$, $Tr_6$, $Tr_7$, and $Tr_8$ are connected to a suitable A. C. source of supply. The thyratrons are also provided in their grid circuits with grid current limiting resistors $R_{16}$, $R_{17}$, $R_{18}$, and $R_{19}$, and with surge condensers $C_8$, $C_9$, $C_{10}$, and $C_{11}$.

A bias battery 70 is connected in the grid circuit of the thyratrons through the potentiometer $P_3$ to adjust the operating point of the tubes. The grid voltage bias is adjusted so that the tubes will not fire at zero control signal, or it is adjusted so that the tubes pass a relatively small current. In the latter case the motor 48 will not rotate since the output currents of the tubes are in opposition and the net result on armature rotation is zero. This latter condition makes for greater sensitivity at weak signals.

Potentiometer $P_3$ is provided with an adjustable tap 72 for balancing the circuit for minor differences in the tubes, the motors and circuit components.

Each thyratron has on its grid circuit the following four voltages: (1) A negative unidirectional bias voltage. (2) An alternating voltage lagging its alternating plate voltage by approximately 90°. (3) A negative unidirectional voltage proportional to the motor speed (a part of the counter E. M. F. voltage obtained from resistors $R_{12}$ and $R_{13}$ which are connected across the armature 52 of the motor 48). (4) A positive unidirectional control voltage proportioned to the desired motor speed obtained from the discriminator tubes through resistors $R_8$ and $R_9$.

When a unidirectional control voltage develops across resistors $R_8$ and $R_9$ (due to an unbalance in the output of discriminator tubes $T_4$ and $T_5$) a positive control voltage is applied to the grid of one thyratron tube and a negative control voltage to the grid of the other thyratron. The tube receiving the negative voltage is at cutoff and will not fire. The tube whose grid is made positive will fire and cause the armature 52 of motor 48 to rotate in the proper direction. As the motor armature comes up to speed it develops a counter E. M. F. proportional thereto which is applied to the grid circuit of the thyratron, and such voltage tends to cancel the control voltage resulting from the discriminator tube unbalance. The motor speed, therefore, stabilizes at that speed which delivers to the grid a counter E. M. F. voltage which is approximately equal to the control voltage on the grid of the tube. Thus, the motor speed is proportional to the control voltage on the grid, thereby satisfying the desired requirements of the tracer.

The speed-load regulation of the invention is very good. Any tendency for the motor 48 to slow down under load causes the counter E. M. F. to drop and thus makes the grid more positive and thereby advances the firing point of the thyratron enough to maintain the motor speed at substantially the value called for by the unidirectional control voltage. Any tendency for the motor 48 to overspeed increases the counter E. M. F. voltage which cuts back the firing point of the thyratron, reducing the motor energizing current, and, therefore, reduces the motor speed.

Any pronounced overspeeding of the motor 48 such as might occur by a sudden change in tracing direction will completely block the first thyratron and cause the opposite thyratron to fire and supply a braking action. Such braking action is proportional to the amount of overspeeding and as soon as the motor is at the proper operating speed, the first tube takes over again. This automatic braking action is an important advantage since it starts to correct for a future error before the error actually occurs, and thus tends to reduce the magnitude of the error or "hunting" action. With prior conventional servo-circuits an error actually has to occur before the correcting action starts.

When the unidirectional control voltage across resistors $R_8$ and $R_9$ is zero, the motor is not supposed to rotate. If under such condition, the motor still tends to rotate, due to inertia or other causes, the counter E. M. F. of the motor will place a positive grid voltage on the proper thyratron tube to supply a braking action proportional to the speed of the motor. This braking action, which acts to prevent motor travel at zero control voltage and which acts before an error actually takes place, is an important feature of the invention.

The current flow from the discriminator tube through the RC combination in its cathode circuit may be a high peak of short duration. Such high peak could cause firing of the thyratron at an improper time. Therefore, for the most satisfactory operation the alternating plate voltage on the north discriminator tube is phased so that the voltage peak in the north RC circuit occurs at a time when the plate of the north thyratron is negative.

For any given set of tracing conditions, the output of the discriminator tubes is proportional to the alternating plate voltage on these tubes. The voltage across the RC circuits is proportional to the output of the tubes, and speed of the drive motors is proportional to the voltage difference in the two opposing RC circuits. Therefore, the traverse speed of the machine can be adjusted by simply adjusting the alternating plate voltage on the discriminator tubes.

Convenient means for adjusting the machine in a suitable tracing position is also provided. For this purpose each of the discriminator tubes is equipped with a normally open push-button switch $S_4$, $S_5$, $S_6$ and $S_7$ which, when closed, connects the grid of the tube to its cathode, thus placing substantially zero grid voltage on the tube, thereby rendering it conductive. The switches $S_4$, $S_5$, $S_6$ and $S_7$ correspond to the N, S, E and W tracer drives. Thus, if the operator wishes to run the machine in a north direction he simply operates the N-push-button $S_4$, causing the N-discriminator tube $T_4$ to become conductive, thereby causing the N thyratron $Th_4$ to fire and run the N-S motor so that it drives the machine in a northerly direction.

Each of the discriminator tubes $T_4$, $T_5$, $T_6$ and $T_7$ has in its grid circuit a resistor $R_{20}$, $R_{21}$, $R_{23}$ and $R_{24}$. Such resistors $R_{20}$, $R_{21}$, $R_{23}$ and $R_{24}$ have the following important functions:

1. They serve to isolate the four grids of the discriminator tubes from each other. Thus when the N-push-button switch $S_4$ is closed only the N-discriminator tube $T_4$ is rendered conductive.

If it were not for the grid resistors $R_{21}$, $R_{23}$ and $R_{24}$ all of the discriminator tubes would be rendered conductive.

2. As was previously explained, the discriminator tubes are always in either one of the following two operating conditions; i. e. either at cutoff, or at substantially zero grid voltage so that the tubes are conductive. In order to assure such operation the grid voltage is extended over a wider range than is actually necessary to obtain such two operating conditions. Thus, under cutoff conditions all tubes are well beyond the cutoff point and when the tubes are to be conductive the voltage delivered by the trigger circuit carries the discriminator grids well into the positive grid region. Tubes operated in the positive grid voltage region are not as uniform as when operated at zero grid voltage. The resistor in the grid circuit brings the grid voltage closer to the zero region because the grid current causes a voltage drop in the grid resistor which cancels part of the overpositive voltage delivered by the trigger circuit, so that the grid is at substantially zero voltage.

The discriminator-electronic drive of the present invention results in much better performance than the old dynamo-electric generator-motor combination. The speed of response is faster. The rate of acceleration and deceleration is greater. The speed-load characteristic is much better because the circuit automatically corrects any tendency to slow down under load. The maximum to minimum operating speed ratio is several times as great as that which can be obtained from dynamo-electric generators. The drive is smooth even at low speeds because the electronic self-compensating circuit inherently operates at a lower speed than dynamo-electric generators. The response to a given signal is always the same. The speed of response is uniform over a relatively wide range of speeds. The operation is uniform in all directions. Furthermore, tracing errors are smaller because, with the new electronic circuit, the drive motors cannot overspeed, and because of the automatic braking action.

I claim:

1. In an automatic tracer of the type in which the tracing movement of a photocell is controlled by north-south and east-west motors which are driven in response to line viewing light pulsations applied to such photocell, whereby the motors drive the photocell along a path corresponding to a templet viewed by such photocell in the light of such light pulsations, an electronic drive for said motors comprising an electronic trigger coupled to said photocell, four quadrature-phased electronic discriminators coupled to said electronic trigger, means tying the operation of said discriminators in phase with such light pulsations, quadrature-phased east-west and north-south pairs of thyratrons coupled to said discriminators, and means coupling each pair of said thyratrons to the corresponding east-west and north-south motor, so that said motors are energized by the firing of said thyratrons in response to the position of said photocell with respect to such line and drive the photocell along the line at a substantially constant speed.

2. An electronic drive for a line tracker control having N-S and E-W motors which move a photocell along a line viewed thereby in the light of a beam which is interrupted at a constant rate in synchronism with quadrature-phased discriminator tubes, operatively associated with such photocell, comprising the combination of N-S and E-W pairs of thyratrons, the output circuits of said thyratrons being connected in driving relation to the corresponding N-S and E-W motors, and the input circuits of said thyratrons being coupled to the output circuits of the corresponding pairs of discriminator tubes, unidirectional signal voltage storage circuits connected in the couplings between said discriminator tubes and thyratrons, a source of alternating 90° lagging phase shift voltage connected in such input circuit, and a source of rotating alternating potential connected to the plate circuits of said tubes, whereby the motors are driven in the proper direction and at a speed proportional the unidirectional signal voltages supplied by the output circuits of said discriminator tubes, to move the photocell along such line at a constant speed.

3. In a line tracker control system, the combination comprising a resistance-coupled circuit including a photocell and a trigger tube, the current output of which is either zero when light is applied to the photocell, or maximum when light is not applied thereto, a discriminator circuit connected to said circuit, said discriminator circuit including two pairs of tubes the plate circuits of which are so connected with a two-phase source of alternating current that the plate voltages applied to the tubes of each pair are 180° out of phase with each other, and the grids of which are connected through individual resistors to a common lead in the output circuit of said trigger tube, whereby all of the discriminator tubes are either at cutoff grid voltage when the trigger tube is conducting, or at substantially zero grid voltage when the trigger tube is at "cutoff," and any one of the discriminator tubes acts to pass plate current when its grid voltage is at zero at any time during the 180° in which its plate voltage from the two-phase alternating current supply is positive, each pair of said discriminator tubes having a common cathode lead, a voltage-storage circuit connecting such cathode lead to the corresponding plate circuit of each tube, a drive circuit coupled to said discriminator circuit, including two pairs of thyratrons the plate circuits of which are connected with a two-phase source of alternating current so that the plate voltages applied to the thyratrons of each pair are 180° out of phase with each other, each pair of thyratrons being coupled to the corresponding pair of discriminator tubes and having phase-shift alternating grid potential means associated therewith, and a shunt motor driven by the output current of each pair of thyratrons, each motor having a separately excited field and an armature connected across the plate circuit of the corresponding pair of thyratrons, whereby the motor speed is proportional to a control voltage delivered to the grid of the proper thyratron of each pair by the corresponding pair of discriminator tubes through the resistor-condenser voltage storage circuit associated therewith.

4. In a contour tracing device the combination comprising a photocell, a discriminator responsive to said photocell for separating the photocell signal into north, east, south and west components, north, east, south and west thyratrons responsive to said discriminator circuit, a north-south motor responsive to the north-south thyratron, and an east-west motor responsive to the east-west thyratron, such motors supplying to the grid circuits of their respective pairs of thyratrons a voltage proportional to the speed of each motor, which voltage bucks the signal voltage from the discriminator circuit, and circuit connections such that if the motor tends to overspeed or overtravel the voltage proportional to such motor speed will exceed the discriminator signal voltage and take the control away from the driving thyratron and cause the opposing thyratron to fire, thus providing a motor braking action which is proportional to the difference between such voltages.

5. An electronic drive for a line tracker control having N-S and E-W motors which move a photocell and a line relatively one to the other, which line is rotationally scanned in synchronism with two pairs of quadrature-phased discriminator tubes, comprising the combination of N-S and E-W pairs of thyratrons, the output circuits of said thyratrons being connected in driving relation to the corresponding N-S and E-W motors, the input circuits of said thyratrons being coupled to the output circuits of the corresponding pairs of discriminator tubes, unidirectional storage circuits connected in the couplings between said discriminator tubes and the thyratrons, a source of quadrature-phased potential connected to the plate circuit of said thyratron tubes, a source of alternating voltage lagging the plate voltage of said thyratrons by approximately 90 degrees connected in the input circuit of said thyratron tubes, whereby the motors are driven in the proper direction and at a speed proportional to the resultant unidirectional signal voltages supplied by the output storage circuits of said discriminator tubes to move the photocell and line relatively one to the other at substantially constant speed.

6. In a line tracker control comprising a photocell, an electronic discriminator circuit including north, south, east and west discriminator tubes, and means controlled by the signal output of said tubes for driving said photocell at a constant speed relative to a line to be followed, an electronic trigger circuit connected between said photocell and said discriminator circuit, said trigger circuit being always in either one of two states, i. e., conducting maximum current under one set of light conditions on the photocell and conducting minimum current under another set of light conditions on the photocell and means including a common lead connecting the grid circuits of said discriminator tubes to the plate circuit of said trigger tube, whereby all of said discriminator tubes are at "cutoff" grid voltage when the trigger tube is conducting maximum current, and all of said discriminator tubes are at substantially zero grid voltage when the trigger tube is conducting minimum current, each of said discriminator tubes having in its output circuit a signal storage circuit so connected that the N-S and E-W pairs of storage circuits deliver to said driving means the two signal components required by said driving means.

7. In a line tracker control system, the combination comprising a photocell and a trigger tube, the current output of which is either zero when light is applied to the photocell, or maximum when light is not applied thereto, a discriminator circuit connected to said amplifier circuit, said discriminator circuit including two pairs of tubes the plate circuits of which are so connected with a two-phase source of alternating current that the plate voltages applied to the tubes of each pair are 180° out of phase with each other, and the grids of which are connected to a common lead in the output circuit of said trigger tube, whereby all of the discriminator tubes are either at cutoff grid voltage when the trigger tube is conducting, or at substantially zero grid voltage when the trigger tube is at "cutoff," and any one of the discriminator tubes acts to pass plate current when its grid voltage is at zero at any time during the 180° in which its plate voltage from the two-phase alternating current supply is positive, each of said discriminator tubes having a voltage-storage circuit in its output circuit, a drive circuit coupled to said discriminator circuit output, including two pairs of thyratrons the plate circuits of which are connected with a two-phase source of alternating current so that the plate voltages applied to the thyratrons of each pair are 180° out of phase with each other, each pair of thyratrons being coupled to the corresponding pair of discriminator tubes and having phase-shifted alternating grid potential means associated therewith, and a motor driven by the output current of each pair of thyratrons, whereby the motor speed is proportional to a control voltage delivered to the grid of the proper thyratron of each pair by the corresponding pair of discriminator tubes through the resistor-condenser voltage storage circuit associated therewith.

8. In a contour tracing device the combination comprising a photocell, a discriminator circuit responsive to said photocell which separates the photocell signal into north, east, south and west components, a pair of circuits associated with said discriminator circuits for combining the four N, E, S and W signal components into two resultant components, a N-S and an E-W signal component; N-S and E-W thyratrons responsive to the N-S and E-W signal components, a N-S motor responsive to the output of the N-S thyratrons, and an E-W motor responsive to the E-W thyratrons, means for applying to grids of said thyratrons a grid voltage always lagging the plate voltage by approximately 90 degrees, and means for applying to such grid circuits a voltage proportional to the motor speed.

9. In a contour tracing device the combination comprising a photocell, a discriminator responsive to said photocell for separating the photocell signal into N, E, S and W components, a pair of circuits for combining such four components into two resultant components, a N-S resultant component and an E-W resultant component; N-S and E-W thyratrons responsive to said N-S and E-W resultant components, a N-S motor responsive to the N-S thyratrons, and an E-W motor responsive to the E-W thyratrons, such motors supplying to the grid circuits of the corresponding pair of thyratrons a counter-electromotive force voltage which bucks the voltage supplied by the corresponding combining circuit causing the motor to run at a speed such that the counter-electromotive force substantially equals the voltage supplied by the combining circuit.

ROSCOE R. LOBOSCO.

REFERENCES CITED

The following references are of record in the file of this patent:

UNITED STATES PATENTS

| Number | Name | Date |
|---|---|---|
| 2,397,933 | Fowle et al. | Apr. 9, 1946 |
| 2,410,295 | Kuehni et al. | Oct. 29, 1946 |
| 2,499,178 | Berry et al. | Feb. 28, 1950 |